United States Patent [19]
D'Arcy et al.

[11] Patent Number: 6,079,010
[45] Date of Patent: Jun. 20, 2000

[54] MULTIPLE MACHINE VIEW EXECUTION IN A COMPUTER SYSTEM

[75] Inventors: Paul Gerard D'Arcy, North Wales; Sanjay Jinturkar, Bethlehem; C. John Glossner, Allentown, all of Pa.; Stamatis Vassiliadis, Zoetermeer, Netherlands

[73] Assignee: Lucent Technologies Inc., Murray Hill, N.J.

[21] Appl. No.: 09/052,671

[22] Filed: Mar. 31, 1998

[51] Int. Cl.[7] ............................................ G06F 9/30
[52] U.S. Cl. ................................................. 712/212
[58] Field of Search .......................... 712/23, 200, 208, 712/212

[56] References Cited

U.S. PATENT DOCUMENTS

| | | | |
|---|---|---|---|
| 5,481,693 | 1/1996 | Blomgren et al. ...................... | 395/375 |
| 5,542,059 | 7/1996 | Blomgren ................................ | 395/375 |
| 5,568,646 | 10/1996 | Jagar ....................................... | 395/800 |
| 5,740,461 | 4/1998 | Jagar et al. ............................. | 395/800 |
| 5,774,686 | 6/1998 | Hammond et al. ..................... | 395/385 |

OTHER PUBLICATIONS

C.J. Glossner and S. Vassiliadis, "The Delft–Java Engine: An Introduction," Lecture Notes in Computer Science, Springer–Verlag, Third International Euro–Par Conference (Euro–Par '97 Parallel Processing), pp. 766–770, Passua, Germany, Aug. 26–29, 1997.

ARM 7TDMI Datasheet, Advanced RISC Machines, Ltd., UK, Document No. ARM DDI 0029E, Aug. 1995.

M.V. Wilkes, "The Best Way to Design an Automatic Calculating Machine," in E. Swartzlander Jr., Computer Design Development: Principle Papers, pp. 266–270, Hayden Book Company, Rochelle Park, New Jersey, 1976.

*Primary Examiner*—David Y. Eng
*Attorney, Agent, or Firm*—Ryan & Mason, L.L.P.

[57] ABSTRACT

A computer system supporting N different machine views, where N≧2, includes a memory for storing instructions, a number of execution units for processing data based on execution controls, and N different decoders for generating the execution controls using instructions retrieved from the memory. Each of the N decoders is operative to decode retrieved instructions in accordance with one of the N machine views. A particular one of the N decoders to be used to decode a given retrieved instruction may be selected by a program running on the system. In one embodiment, the decoders for the N machine views are implemented as N separate decoders, and a multiplexer is used to select the output of one of the N decoders for connection to one or more of the execution units. In another embodiment, a set of reconfigurable hardware is dynamically reprogrammed to implement one or more of the N decoders as directed by the program running on the system.

24 Claims, 3 Drawing Sheets

MULTIPLE MACHINE VIEW EXECUTION IN A COMPUTER SYSTEM

FIELD OF THE INVENTION

The present invention relates generally to computer systems, and more particularly to computer systems which are capable of executing instruction sets corresponding to two or more different computer architectures.

BACKGROUND OF THE INVENTION

A computer system architecture may be defined as a set of properties that determine what programs will run on the system and what results the programs will produce. The "organization" of a computer system refers generally to the dataflow and control layout within the system. The organization of a computer system is also often referred to as an "implementation" of the system. FIG. 1 illustrates an organization of a conventional computer system 10. The computer system 10 includes a memory 12, a data bus 14, an address bus 16, a number of execution units, and a number of register files. The execution units include an address generator 18, a load/store unit 20, an arithmetic unit 22 and a branch unit 24. The register files include a common 32×32 register file 26 shared by the execution units 20, 22 and 24, as well as a base register file 28 and an offset/displacement register file 30 for use in addressing the memory 12 via address generator 18. Control flow in the system 10 assumes that instructions are fetched from memory 12 via a fetch unit 32 and then decoded in a decoder 34 to produce corresponding execution controls. The execution controls then control the flow of data through the execution units. A typical instruction stream in the computer system 10 is shown in Program 1 below:

```
label: add r3, r1, r2;
       load r4, base0, offset0;
       mpy r7, r5, r6;
       store r7, base1, offset1;
       branch some_label;
Program 1: Typical Instruction Stream
```

The first instruction in Program 1 resides at the symbolic memory address label. The instruction contained at that address instructs the system to add the contents of register r1 in the register file 26 to the contents of register r2 and place the result in register r3. Similarly, the load instruction tells the system to add the contents of base0 in base registers 28 and offset0 in offset/displacement registers 30 to form the effective memory address. The contents of the memory 12 at that address are then placed in register r4 in the register file 26. The multiplication instruction mpy multiplies the contents of registers r5 and r6 and places the result in register r7. The store instruction writes the value of register r7 to the effective memory address formed by adding the contents of base1 and offset1. The branch instruction causes a change in the control flow, such that an instruction address register (IAR) in system 10 will be modified to point to the address some_label. Program execution then continues from the modified instruction address.

The above-described conventional computer system organization typically supports a single architecture or "machine view." One known technique for allowing a system such as system 10 to support two machine views involves the use of a branch-exchange instruction to pass control from one processor to another within the system. The branch-exchange instruction invokes an interrupt on a requesting processor to pass control to the other processor, and control returns back to the requesting processor by a similar mechanism. However, this technique generally does not allow any sharing of dataflow execution units. A related technique which does allow some sharing of execution units has been used in the Delft-Java processor to branch between a Java Virtual Machine view and a RISC-based machine view, as described in greater detail in C. J. Glossner and S. Vassiliadis, "The Delft-Java Engine: An Introduction," Lecture Notes in Computer Science, Springer-Verlag, Third International Euro-Par Conference (Euro-Par '97 Parallel Processing), pp. 766–770, Passua, Germany, Aug. 26–29, 1997, which is incorporated by reference herein. In the Delft-Java processor, a reserved opcode is used as a branch-exchange instruction to allow control to be passed back and forth between the two views. Another dual machine view technique is implemented in the ARM Thumb processor, as described in ARM 7TDMI Datasheet, Advanced RISC Machines, Ltd., UK, Document No. ARM DDI 0029E, August 1995. However, in this technique one of the processor machine views is actually an architectural subset of the other machine view.

As previously noted, conventional computer systems are generally unable to support more than two different machine views. Moreover, even those systems which can simultaneously support dual machine views generally cannot be dynamically reprogrammed to support a variety of different types of machine views using, for example, field programmable gate arrays (FPGAs) or other reconfigurable hardware. The total number and type of machine views which can be supported in a given conventional system is therefore unduly limited, as is the degree to which execution units and other processing elements can be shared between machine views.

SUMMARY OF THE INVENTION

The invention provides methods and apparatus that allow a computer system to execute code written for multiple instruction set architectures using a single system implementation. The different architectures or machine views supported by a computer system configured in accordance with the invention can be selected under program control and reprogrammed dynamically, with possibly concurrent instruction streams from multiple machine views executed by the same functional execution units in the system. In an illustrative embodiment of the invention, a computer system supporting N different machine views, where $N \geq 2$, includes a memory for storing instructions, a number of execution units for processing data based on execution controls, and N different decoders for generating the execution controls using instructions retrieved from the memory. The computer system datapath is configured to provide the superset of operations required by the multiple instruction sets of the N machine views. Each of the N decoders is operative to decode retrieved instructions in accordance with one of the N machine views. A particular one of the N decoders to be used to decode a given retrieved instruction may be selected by a program running on the system.

In one possible version of the above-described illustrative embodiment, the decoders for the N machine views are implemented as N separate decoders, and a multiplexer is used to select the output of one of the N decoders for connection to one or more of the execution units. In another possible version of the illustrative embodiment, a set of reconfigurable hardware is dynamically reprogrammed to implement one or more of the N decoders as directed by the program running on the system. For example, the program can direct the downloading of an appropriate decoder or decoders into FPGA circuitry as required.

In either of the above versions of the illustrative embodiment, the program may select a given one of the N decoders using a branch machine view (bmv) instruction. The bmv instruction may be configured either to imply that a subsequent instruction address in the program is a branch target address, to specify a branch target address, or to specify a register which contains a branch target address. The program may make use of a stack for storing an indicator of a given machine view in use by the system upon receipt of a bmv instruction to branch to another machine view, such that when program execution returns to an instruction following the bmv instruction, the system will return to using the given machine view.

In accordance with another aspect of the invention, multithreaded programming techniques may be utilized to take advantage of the N different machine views supported by the computer system. For example, a program running on the system may include a thread for at least a subset of the N machine views supported by the system. A compiler in the system then utilizes the threads to generate code suitable for use with the corresponding machine views. The system may also include a schedule/issue unit which is operative to check for availability of system resources, and to issue execution controls to execution units of the system from multiple machine views if the appropriate resources are available.

By permitting the use of any number and type of machine views in a single computer system, the invention allows customization of the system to new applications while maintaining compatibility with previous architectures. Other advantages which can be provided by the invention include, for example, fast execution of multiple, possibly concurrent instruction streams, algorithmic optimization of run-time workloads, compiler-directed optimization for either performance or code density, and direct execution of certain types of complex code. These and other features and advantages of the present invention will become more apparent from the accompanying drawings and the following detailed description.

DETAILED DESCRIPTION OF THE INVENTION

The invention will be illustrated below in conjunction with exemplary computer system implementations. It should be understood, however, that the invention is not limited to use with any particular type of computer system, but is instead more generally applicable to any processing system in which it is desirable to support multiple machine view execution without unduly increasing the hardware requirements of the system. For example, although illustrated using implementations which support two different machine views, the invention can also be implemented in embodiments which support any number of multiple machine views. The term "machine view" as used herein refers to an architecture or other instruction set-based configuration of a computer system. Illustrative machine views include, for example, a reduced instruction set computer (RISC) machine view, a complex instruction set computer (CISC) machine view, a digital signal processor (DSP) machine view, and other register-based, stack-based, memory-to-memory, or vector-based machine views. The term "computer system" as used herein is intended to include any computing device in which instructions retrieved from a memory or other storage device are executed using one or more execution units. Computer systems in accordance with the invention may therefore include, for example, personal computers, mainframe computers, network computers, workstations, servers, microprocessors, application-specific integrated circuits (ASICs), as well as other types of data processors.

The invention allows a given computer system to execute code written for multiple instruction set architectures using a single system implementation. The different architectures or machine views supported by the given computer system can be selected under program control and reprogrammed dynamically. The invention thus allows a programmer to alter a computer system so as to utilize any number and type of multiple machine views, with possibly concurrent instruction streams from multiple machine views executed by the same functional execution units within the system.

Figure 1:
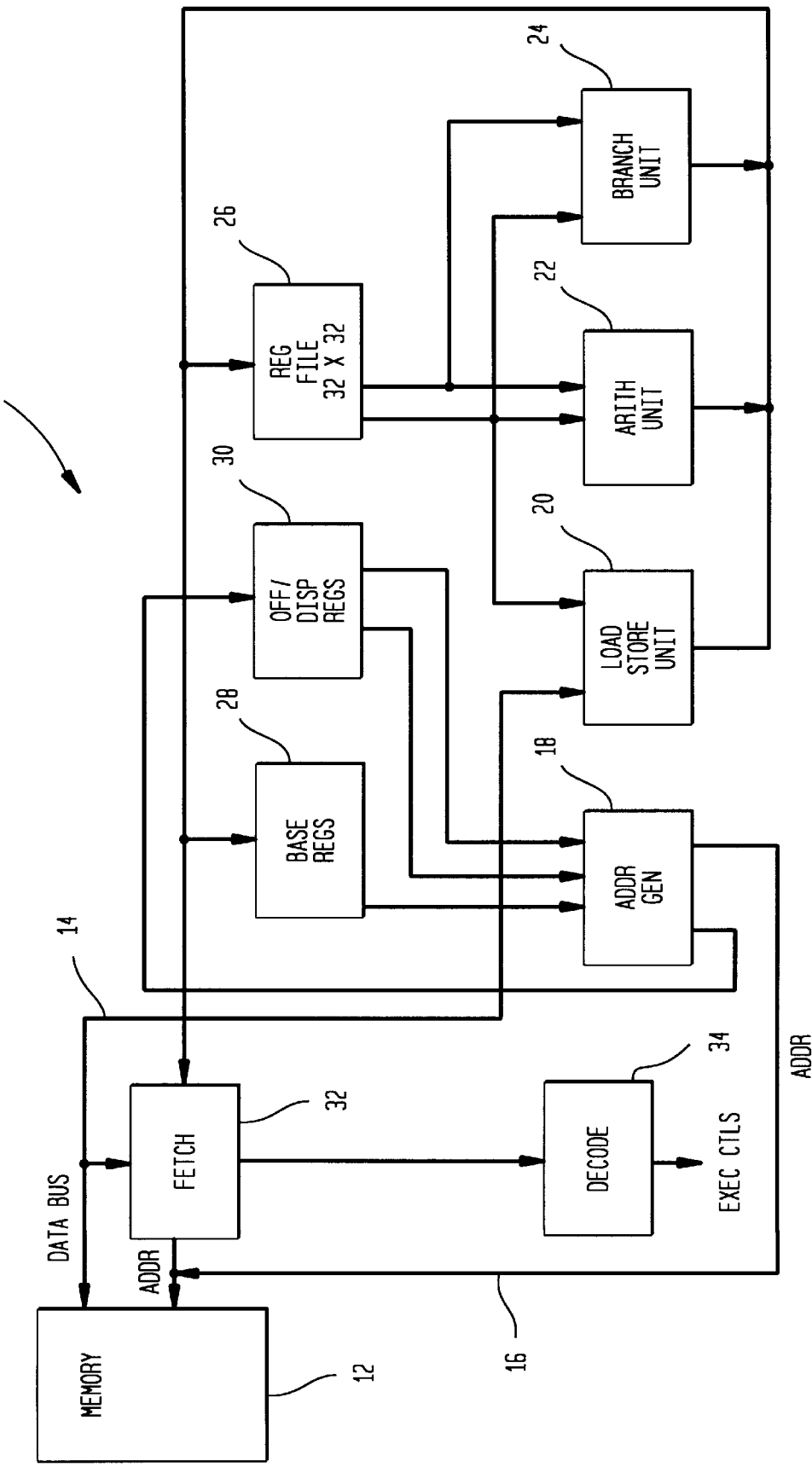
FIG. 1 shows a conventional computer system.
Figure 2:
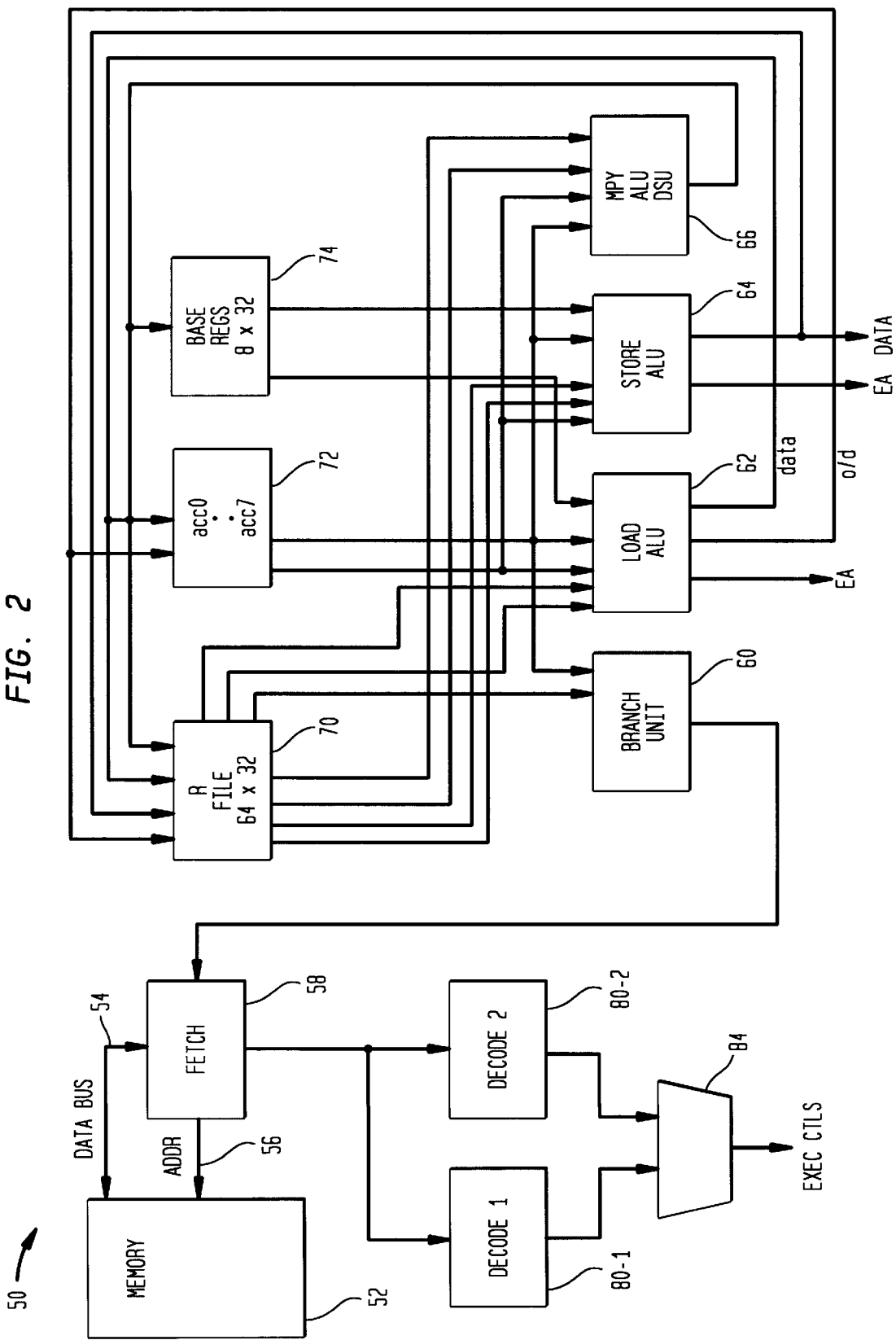
FIG. 2 shows a multiple machine view computer system in accordance with a first illustrative embodiment of the present invention.

FIG. 2 shows an organization of a computer system 50 in accordance with one possible embodiment of the invention. The system 50 includes a memory 52, a data bus 54 and an address bus 56. A fetch unit 58 fetches instructions from the memory 52 using an address supplied by a branch unit 60. In this embodiment, the fetch unit 58 fetches a single instruction per clock cycle. The fetch unit 58 delivers the instruction address to the memory 52 via the address bus 56, and the corresponding retrieved instruction is supplied from memory 52 to the fetch unit 58 via the data bus 54. In addition to the branch unit 60, the system 50 includes a number of other execution units, including a load arithmetic logic unit (ALU) 62, a store ALU 64, and a multiply ALU 66. The execution unit 66 in this embodiment also includes a data selector unit (DSU) which performs operations such as bit manipulation and register-to-register moves. The load ALU 62 and store ALU 64 can each output an effective address (EA) and corresponding data as shown. The EA may be generated by adding an offset and a displacement value to the contents of a base register. The load ALU 62 in this embodiment can also output offset/displacement (o/d) values. As will be described in greater detail below, the execution units 60, 62, 64 and 66 may be shared by each of the machine views supported by the system 50.

The system 50 also includes a number of register files, including a 64×32 Base R register file 70, an accumulator file 72, and an 8×32 base register file 74. For simplicity of illustration, an offset/displacement register file is not shown separately in FIG. 2, but is instead assumed to be merged into the Base R register file 70. The accumulator file 72 in this embodiment includes eight registers acc0, acc1, . . . acc7. It should be emphasized that the type and arrangement of execution units and register files in system 50 is exemplary only, and that the invention can be implemented with numerous alternative arrangements of these and other elements.

The system 50 further includes two decoders 80-1 and 80-2 which are coupled to an output of the fetch unit 58 as shown. In operation, the system 50 may be configured under software control to select one of the decoders 80-1 and 80-2 for use in decoding a particular fetched instruction. Each of the decoders 80-1, 80-2 interprets the retrieved instructions in accordance with a different machine view supported by the system 50. A multiplexer 84 is used to select the output of one of the decoders 80-1, 80-2 for use in supplying execution controls to one or more of the execution units 60, 62, 64 and 66. The decoder selection provided by the multiplexer 84 may be controlled by the above-noted software running on system 50.

Although shown as including two separate decoders for supporting two different machine views, the system 50 can more generally be implemented to include N decoders for supporting N different machine views. In such an embodiment, the multiplexer 84 may be implemented as an N×1 multiplexer rather than a 2×1 multiplexer. Alternatively, two or more different decoders may be implemented using reconfigurable hardware such as field programmable gate arrays (FPGAs). In this case, a single set of reconfigurable hardware may serve as a reprogrammable decoder or set of decoders. The actual decoder logic for decoding the instruction set of a given machine view is downloaded into the reconfigurable hardware as needed. For example, the elements 80-1 and 80-2 in FIG. 2 may each be viewed as representing the same set of reconfigurable hardware at a different point in time, or may be viewed as a single set of reconfigurable hardware which simultaneously implements two different decoders. In this manner, a computer system in accordance with the invention can be configured to support any number and type of machine views, while providing highly efficient sharing of execution units between machine views.

```
label: add r3, r1, r2;
       load r4, base0, offset0;
       mpy r7, r5, r6;
       store r7, base1, offset1;
       bmv Decode_2; // branch machine view
       {} //
       acc0=*p2++;
       acc1=acc0*acc2 + acc1;
       *p3++=acc1;
       do 14 {
           acc0=*p2++; acc1=acc0*acc2 + acc1;
           *p3++=acc1;
       }
       acc1=acc0*imm4;
       *p3++=acc1;
       bmv Decode_1;
       {}
       branch some_label;
Program 2: Multiple Machine View Instruction Stream
```

An example of a multiple machine view instruction stream suitable for execution in system 50 is shown in Program 2. Various aspects of the notation used in Program 2 and other example Programs listed herein are described in greater detail in, for example, Kernighan and Ritchie, "The C Programming Language," $2^{nd}$ Edition, Prentice Hall, 1988, and "DSP1611/17/18/27 Digital Signal Processor Information Manual," Lucent Technologies, February 1996, both of which are incorporated by reference. The first four instructions in Program 2 are the same as those described previously in conjunction with Program 1. The fifth instruction is a branch machine view (bmv) instruction that informs the system that a branch to a new machine view (i.e., the machine view corresponding to Decode_2) is to take place, and that the system will now use decoder 80-2 to generate execution controls from retrieved instructions. As an example, the machine view corresponding to decoder 80-2 may be a DSP-like machine view. In a typical DSP assembly language program, the notation may be different than that of the other machine view (i.e., the machine view implemented by decoder 80-1) but the corresponding machine instructions may be substantially equivalent if both machine views use the same arithmetic encodings (e.g., two's complement). It should be noted, however, that this embodiment of the invention does not require any particular relationship between the multiple machine views supported by a given system, but only that the system datapath provides the superset of operations of the multiple machine views.

The instruction acc0=*p2++ following the bmv instruction in Program 2 directs the system 50 to place into register acc0 of accumulator file 72 the contents of the memory location pointed at by pointer p2. The pointer p2 is then incremented by 1, as indicated by the notation "++" which specifies post incrementing. The next instruction performs a multiply and accumulate operation, and the following instruction performs a store operation. The do loop in Program 2 is a software pipelined loop which groups together the instructions enclosed in brackets and performs them concurrently for 14 cycles. The software pipelined loop is then exited. The operation acc1=acc0*imm4 updates register acc1 with the results of a multiplication of the contents of acc0 and a four-bit immediate field in the instruction format. After completion of the remaining computations, the system branches to the other machine view (i.e., the machine view corresponding to Decode_1) and uses decoder 80-1 to generate execution controls from subsequent retrieved instructions.

In an alternative embodiment of the system 50, a branch address may be defined so that the bmv instruction need not imply the next instruction address as the branch target. An example of a bmv instruction with a specified branch target is shown in Program 3 below.

```
label: // RISC machine view
       add r0, r1, r2;
       bmv Decode_2, dspView;
       dspView:
       acc0=*p0++;
       . . .
Program 3: BMV with Specified Branch Target
```

The bmv instruction in Program 3 selects both the decoder to use after the branch and the address of the instruction to begin executing from. If there is not sufficient space in the instruction format to encode the branch address, then a full instruction address can be loaded into a register with the bmv instruction using the contents of the register as the branch target address. Program 4 below is an example of such an embodiment, in which an lda instruction loads the branch target address into a register r3.

```
label: // RISC machine view
       add r0, r1, r2;
       lda r3, dspView;
       bmv Decode_2, r3
       . . . // many instructions
       dspView:
       acc0=*p0++;
       . . .
Program 4: BMV with Specified Branch Target Stored in Register
```

The variant of the bmv instruction illustrated in Program 4 may be treated as a call instruction. This implies that the current machine view represents state to the executing program. Program frames are generally created whenever a subroutine is entered, and are used to allocate storage space for passing arguments, saving state and other supervisory functions. When a new frame is created on a stack such as stack 104 to be described below in conjunction with FIG. 3, the current machine view may be pushed onto the stack so that when program execution returns to the instruction following the bmv instruction, the appropriate decoder will be selected. Using the bmv instruction illustrated in Programs 2, 3 and 4 above, it is possible to provide support for a wide variety of multiple machine views including, for example, register-based, stack-based, memory-to-memory, and vector-based machine views.

```
main() {
    Thread t1 = new RiscThread();
    Thread t2 = new DspThread();
    t1.Run();
    t2.Run();
}
Program 5: Multithreaded Model
```

Program 5 above illustrates a technique by which a high-level language programmer may take advantage of multiple machine view execution in accordance with the invention. In this sample program, two threads are created: a RISC thread for a RISC machine view, and a DSP thread for a DSP machine view. A compiler may recognize that the DSP thread can benefit from a wide issue machine view and may therefore generate code that can issue in parallel from a DSP compound instruction set architecture. The compiler may also recognize that the RISC thread is dominated by control code. It would then generate code that issues through the register file for this thread. Additional details regarding multithreaded programming such as that illustrated in Program 5 may be found in, for example, B. Lewis and D. J. Berg, "Threads Primer: A Guide to Multithreaded Programming," Sunsoft Press—A Prentice Hall Title, Mountain View, Calif., 1996, which is incorporated by reference herein.

Figure 3:
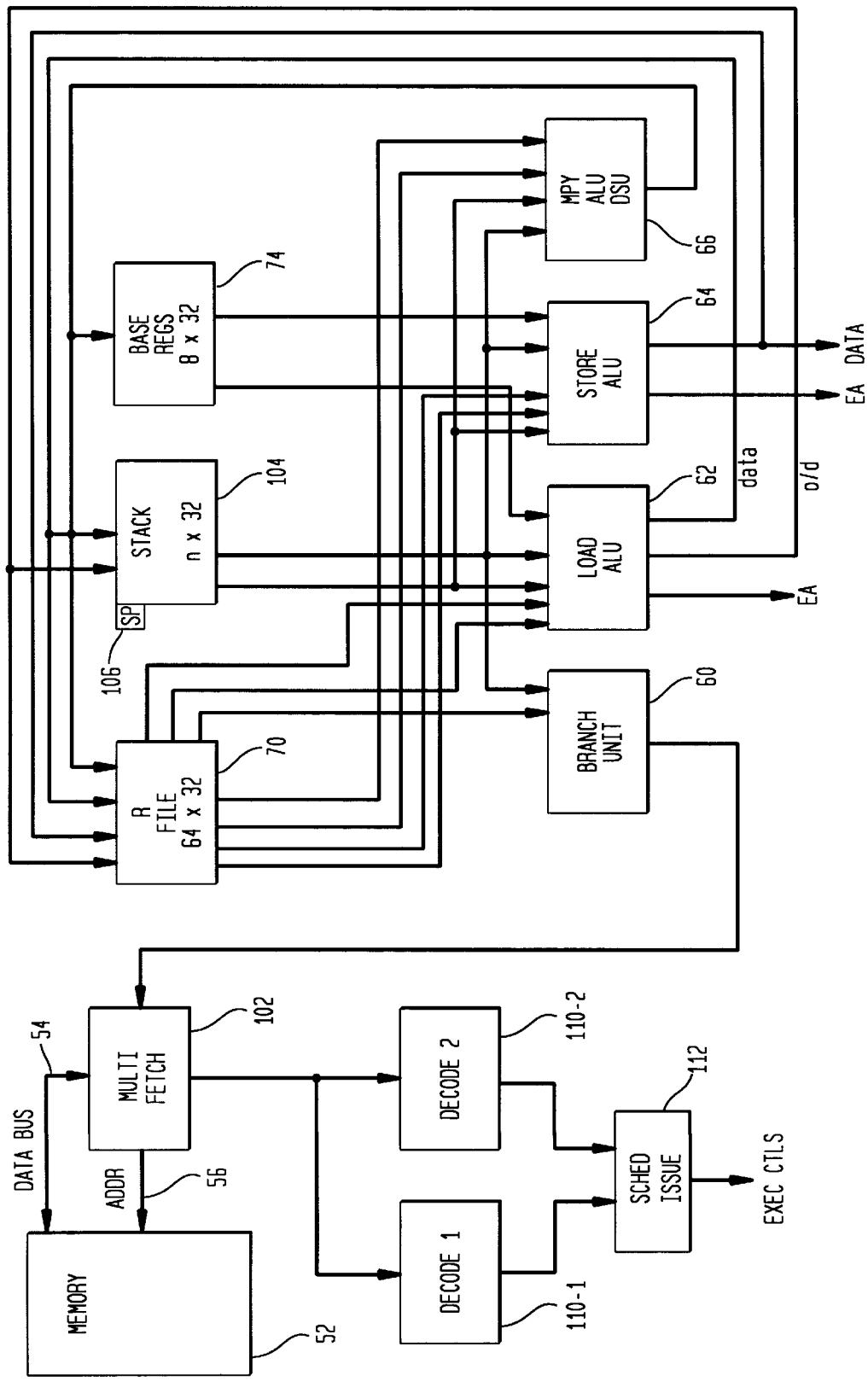
FIG. 3 shows a multiple machine view computer system in accordance with a second illustrative embodiment of the present invention.

FIG. 3 shows a computer system 100 in accordance with an alternative embodiment of the invention. The system 100 includes memory 52, data bus 54, address bus 56, branch unit 60, load ALU 62, store ALU 64, multiply ALU 66, Base R register file 70 and Base register file 74, all of which operate in a manner similar to that described in conjunction with FIG. 2 above. The system 100 also includes a multi-fetch unit 102 which is capable of fetching multiple instructions per clock cycle from the memory 52. The system 100 further includes an n×32 stack 104, with a stack pointer 106. The value n refers to an implementation-specific number of stack locations within the stack 104, and may range from as low as about four to on the order of 106 or more. The stack 104 may be used to store indications of different machine views, such that when program execution returns to an instruction following a bmv instruction, it goes to the stack 104 to determine the appropriate decoder to select. The instructions fetched by the multi-fetch unit 102 are supplied to two decoders 110-1 and 110-2, each of which corresponds to a different machine view supported by the system 100. A schedule/issue unit 112 in system 100 checks for availability of system resources (e.g., execution units 60, 62, 64 and 66) and issues execution controls to the execution units from multiple machine views if the appropriate resources are available. In the case of a multithreaded implementation, the schedule/issue unit 112 need only check for available execution units since threads are by definition independent unless synchronized by an atomic operation, as described in the above-cited multithreaded programming references.

The embodiments of the present invention described above may be configured to meet the requirements of a variety of different computing applications and environments, using any desired set of computer system architectures. The above-described embodiments of the invention are therefore intended to be illustrative only. Numerous alternative embodiments within the scope of the following claims will be apparent to those skilled in the art.

What is claimed is:

1. A computer system which supports N different machine views, where $N \geq 2$, the system comprising:
    a memory;
    at least one execution unit for processing data based on execution controls generated from instructions retrieved from the memory;
    a plurality of decoders coupled between the memory and the execution unit, wherein a given one of the decoders is operative to decode at least a portion of the instructions retrieved from the memory in accordance with a corresponding one of the N machine views supported by the system; and
    selection circuitry for controlling selection of a given one of the plurality of decoders based at least in part on one or more of the retrieved instructions, wherein at least one of the retrieved instructions comprises a branch instruction directing the computer system to branch from one of the machine views to another of the machine views, and further wherein an indicator of a given one of the machine views in use upon receipt of the branch instruction is stored such that when instruction execution returns to an instruction following the branch instruction, the system returns to using the given machine view.

2. The computer system of claim 1 wherein a given one of the N machine views is selected for use at a given time by a program running on the system.

3. The computer system of claim 1 further including N different decoders, wherein each of the N decoders decodes instructions retrieved from the memory in accordance with one of the N machine views supported by the system.

4. The computer system of claim 3 wherein one of the N different decoders is selected for decoding a particular one of the instructions retrieved from the memory by a program running on the system.

5. The computer system of claim 3 further including a multiplexer operative to select an output of one of the N decoders for application to an execution unit of the system.

6. The computer system of claim 1 further including a set of reconfigurable hardware for implementing the at least one decoder, and wherein the same reconfigurable hardware is used to implement N different decoders, such that each of the N decoders decodes instructions retrieved from the memory in accordance with one of the N machine views supported by the system.

7. The computer system of claim 6 wherein the reconfigurable hardware is reconfigured to provide a given one of the N different decoders by a program running on the system.

8. The computer system of claim 2 wherein the program selects a given one of the N machine views for use at a given time using the branch instruction, and wherein the branch instruction implies that a subsequent instruction address in the program is a branch target address.

9. The computer system of claim 2 wherein the program selects a given one of the N machine views for use at a given time using the branch instruction, and wherein the branch instruction specifies a branch target address.

10. The computer system of claim 2 wherein the program selects a given one of the N machine views for use at a given time using branch instruction, and wherein the branch instruction specifies a register, and the contents of the register correspond to a branch target address.

11. The computer system of claim 1 further including a stack for storing the indicator of the given machine view.

12. The computer system of claim 2 wherein the program running on the system includes a thread for at least a subset of the N machine views supported by the system, and a compiler in the system utilizes the threads to generate code suitable for use with the corresponding machine views.

13. The computer system of claim 1 further including a schedule/issue unit which is operative to check for availability of system resources, and to issue execution controls to execution units of the system from multiple machine views if the appropriate resources are available.

14. A method for use in a computer system which supports N different machine views, where $N \geq 2$, the method comprising the steps of:

retrieving a plurality of instructions from memory; and selecting one of N decoders for use in decoding at least a portion of the retrieved instructions, wherein at least one of the retrieved instructions comprises a branch instruction directing the computer system to branch from one of the machine views to another of the machine views, and further wherein an indicator of a given one of the machine views in use upon receipt of the branch instruction is stored such that when instruction execution returns to an instruction following the branch instruction, the system returns to using the given machine view.

15. The method of claim 14 wherein the selecting step further includes selecting one of N different decoders for decoding an instruction from an instruction set associated with one of the N machine views supported by the system.

16. The method of claim 14 wherein the selecting step further includes reconfiguring a set of reconfigurable hardware to implement one of N different decoders for decoding an instruction from an instruction set associated with one of the N machine views supported by the system.

17. The method of claim 14 wherein the selecting step is implemented by a program running on the system.

18. The method of claim 17 wherein the branch instruction implies that a subsequent instruction address in the program is a branch target address.

19. The method of claim 14 wherein the branch instruction specifies a branch target address.

20. The method of claim 14 wherein the branch instruction specifies a register, and the contents of the register correspond to a branch target address.

21. The method of claim 14 further including the step of storing the indicator of the given machine view in a stack suitable for storing multiple indicators.

22. The method of claim 14 further including the step of generating a thread for at least a subset of the N machine views supported by the system, wherein a compiler in the system utilizes the threads to generate code suitable for use with the corresponding machine views.

23. A computer system which supports N different machine views, where $N \geq 2$, the system comprising:

a memory for storing instructions to be executed in the system;

N different decoders, wherein each of the N decoders decodes instructions retrieved from the memory in accordance with a corresponding one of the N different machine views; and selection circuitry for controlling selection of a given one of said N different decoders, and wherein at least one of the instructions comprises a branch instruction directing the computer system to branch from one of the machine views to another of the machine views, and further wherein an indicator of a given one of the machine views in use upon receipt of the branch instruction is stored such that when instruction execution returns to an instruction following the branch instruction, the system returns to using the given machine view.

24. A computer system which supports N different machine views, where $N \geq 2$, the system comprising:

a memory for storing instructions to be executed in the system;

a set of reconfigurable hardware for implementing N different decoders, wherein each of the N decoders decodes instructions retrieved from the memory in accordance with a corresponding one of the N different machine views; and selection circuitry for controlling selection of a given one of said N different decoders, and wherein at least one of the instructions comprises a branch instruction directing the computer system to branch from one of the machine views to another of the machine views, and further wherein an indicator of a given one of the machine views in use upon receipt of the branch instruction is stored such that when instruction execution returns to an instruction following the branch instruction, the system returns to using the given machine view.

* * * * *